United States Patent [19]

Carré

[11] Patent Number: 4,961,318
[45] Date of Patent: Oct. 9, 1990

[54] ASSISTED HYDRAULIC BRAKING SYSTEM AND BOOSTER AND CONTROL VALVE DESIGNED FOR SUCH A SYSTEM

[75] Inventor: Jean-Jacques Carré, Le Raincy, France

[73] Assignee: Bendix France, Drancy, France

[21] Appl. No.: 430,744

[22] Filed: Oct. 31, 1989

[30] Foreign Application Priority Data

Nov. 10, 1988 [FR] France .................. 88 14730

[51] Int. Cl.$^5$ .............................. F15B 3/00
[52] U.S. Cl. ...................... 60/579; 60/557; 60/581
[58] Field of Search ............ 60/579, 581, 557

[56] References Cited

U.S. PATENT DOCUMENTS

| 2,429,195 | 10/1947 | Price | 188/152 |
| 3,143,928 | 8/1964 | Wahlstrom | 91/391 |
| 3,173,261 | 3/1965 | Chouings | 60/54.5 |
| 4,182,220 | 1/1980 | Fulmer | 60/579 |
| 4,754,605 | 7/1988 | Seibert et al. | 60/579 X |
| 4,779,422 | 10/1988 | Brown | 60/557 X |

FOREIGN PATENT DOCUMENTS

| 765079 | 1/1957 | United Kingdom . |
| 1439921 | 6/1976 | United Kingdom . |
| 2000564 | 1/1979 | United Kingdom . |
| 2103320 | 2/1983 | United Kingdom . |

Primary Examiner—Allen M. Ostrager
Attorney, Agent, or Firm—Larry J. Palguta; Ken C. Decker

[57] ABSTRACT

The invention relates to an assisted hydraulic braking system comprising a brake pedal (10) connected to an actuating rod (46), a pneumatic brake booster (14) comprising a front vacuum chamber (102) and a rear working chamber (104) separated by a movable deformable partition acting on a push rod, a single master cylinder (16) the piston of which is acted by the push rod, a mechanism (12) for controlling the booster (14), comprising a shutter mechanism (34) putting a first chamber (26) selectively in communication with a second chamber (30) or with the atmosphere responsive to an actuating of the brake pedal (10), a first pipeline (110) putting the first chamber (26) of the control mechanism (12) in communication with the working chamber (104) of the booster (14), a second pipeline (112) putting the second chamber (30) of the control mechanism (12) in communication with the vacuum chamber (102) of the booster (14), a second master cylinder (74) the outlets of which are connected to at least one wheel brake, the second master cylinder (74) being subjected to the actuating pressure transmitted by the actuating rod (46) and increased by the boosting pressure generated by the single master cylinder (16).

5 Claims, 3 Drawing Sheets

ASSISTED HYDRAULIC BRAKING SYSTEM AND BOOSTER AND CONTROL VALVE DESIGNED FOR SUCH A SYSTEM

BACKGROUND OF THE INVENTION

The invention relates to an assisted hydraulic braking system designed especially to be used on a motor vehicle.

On vehicles equipped with an assisted hydraulic braking system, this system conventionally comprises a booster and a master cylinder which are arranged end to end. More specifically, the brake pedal acts on a control rod of the booster, the effect of this being to actuate, within the latter, boosting means moving a push rod which in turn actuates at least one actuating piston equipping the master cylinder. This compact arrangement is advantageous, because it makes it possible to give the booster/master-cylinder assembly a relatively simple structure.

However, there are circumstances in which it is not possible to place the booster directly between the brake pedal and the master cylinder. This situation arises particularly on some vehicles with right-hand drive. In fact, the diametral bulk of the booster can then make it impossible to install it directly between the brake pedal and master cylinder.

FR-A-2 629 033 discloses an assisted hydraulic braking system comprising a brake pedal, a master cylinder, a brake booster and at least one wheel brake, the master cylinder comprising a body equipped with a bore, in which at least one piston for actuating the wheel brake slides sealingly, and the booster comprising a control rod actuating boosting means acting on a push rod which actuates the piston of a hydraulic pressure transmitter, characterized in that the brake pedal acts on an actuating rod of the master cylinder, a first hydraulic circuit putting a control chamber of the master cylinder, formed between the actuating rod and the actuating piston, in communication with a control chamber of the booster, partially delimited by the control rod, in such a way that an actuation of the brake pedal causes a movement of the control rod with the effect of actuating the boosting means, and a second hydraulic circuit putting an actuating chamber of the booster in communication with an actuating chamber of the master cylinder, partially delimited by the actuating piston, in such a way that a movement of the push rod controlled by the boosting means causes a movement of the actuating piston with the effect of actuating the brake.

In a braking system so designed, the brake pedal is placed in the extension of the master cylinder, while the booster can be placed at any location under the bonnet of the vehicle. In fact, the pressure increase arising as a result of the actuation of the brake pedal is transmitted to the booster by the first hydraulic circuit, and the boosting force generated by this booster is in turn transmitted to the master cylinder by the second hydraulic circuit, whatever the position occupied by the booster in relation to the master cylinder.

However, such a system can have some disadvantages. In fact, the booster and the master cylinder are distant from one another and are connected to one another by means of hydraulic pipelines. During the actuation of the brake pedal, the hydraulic fluid contained in these pipelines is subjected to a high pressure. The large number of hydraulic connections under pressure, which is provided in this design, causes a proportionate increase in the risk of leaks.

Furthermore, the special design of the master cylinder intended for equipping such a braking system implies an increase in the number of its components, of the sealing sliding actions and of the return springs. The result of this, therefore, is that it is necessary to exert on the brake pedal a force higher than that which has to be exerted on the brake pedal of a conventional system, and this is contrary to the intended purpose of assisting the braking operations.

SUMMARY OF THE INVENTION

It is therefore an object of the invention to provide an assisted hydraulic braking system, the special design of which allows it to be installed on motor vehicles of any type, particularly on vehicles with righthand drive, and which has a reduced number of hydraulic connections and requires only a low input force.

To achieve this, the subject of the invention is an assisted hydraulic system comprising:
   a brake pedal connected to an actuating rod,
   a pneumatic brake booster comprising a front vacuum chamber and a rear working chamber separated by a movable deformable partition acting on a push rod,
   a single master cylinder the piston of which is acted by said push rod,
   means for controlling the booster, comprising a shutter means putting a first chamber selectively in communication with a second chamber or with the atmosphere responsive to an actuation of the brake pedal,
   a first pipeline putting the first chamber of the control means in communication with the working chamber of the booster,
   a second pipeline putting the second chamber of the control means in communication with the vacuum chamber of the booster,
   a second master cylinder the outlets of which are connected to at least one wheel brake.

According to the invention, the second master cylinder is subjected to the actuating pressure transmitted by the actuating rod and increased by the boosting pressure generated by the single master cylinder.

According to an embodiment of the invention, the means for controlling the booster comprise a body in which is provided at least one sealed volume connected by a pipeline to the working chamber of the single master cylinder.

Preferably, the control means further comprise a piston sliding sealingly in a bore formed in the body and dividing the bore internally into the first chamber formed at the rear of the bore and the second chamber formed at the front of the bore, the shutter element having a front annular active part interacting selectively with two concentric shutter seats formed respectively in the piston and by a valve plunger sliding in the piston and coupled to the actuating rod.

BRIEF DESCRIPTION OF THE DRAWINGS

Preferred embodiments of the invention will now be described by way of example with reference to the accompanying drawings in which.

DETAILED DESCRIPTION OF THE INVENTION

Figure 1:
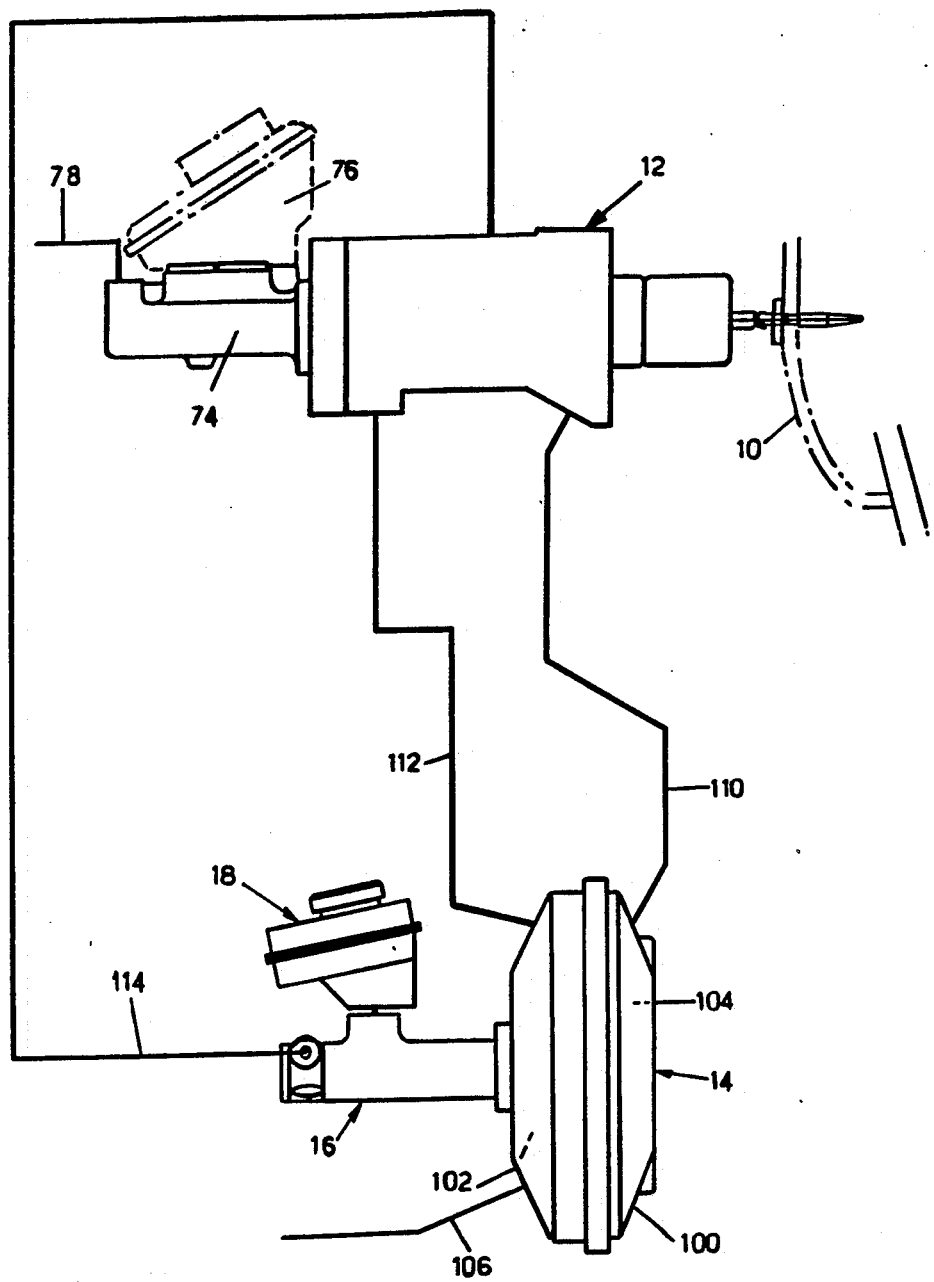
FIG. 1 shows diagrammatically an assisted hydraulic braking system according to the invention.

FIG. 1 illustrates highly diagrammatically an assisted hydraulic braking system which mainly comprises a brake pedal 10, a control valve 12, a brake booster 14, a hydraulic pressure transmitter 16 provided with a brake-fluid reservoir 18, and a master cylinder 74 provided with a reservoir 76.

In the following description, the term "rear" will conventionally refer to the end towards which the movable components move when these components return towards their rest position, and the term "front" will refer to the end towards which the movable components move when they are actuated. The rear ends are directed to the right in the Figures.

Figure 2:
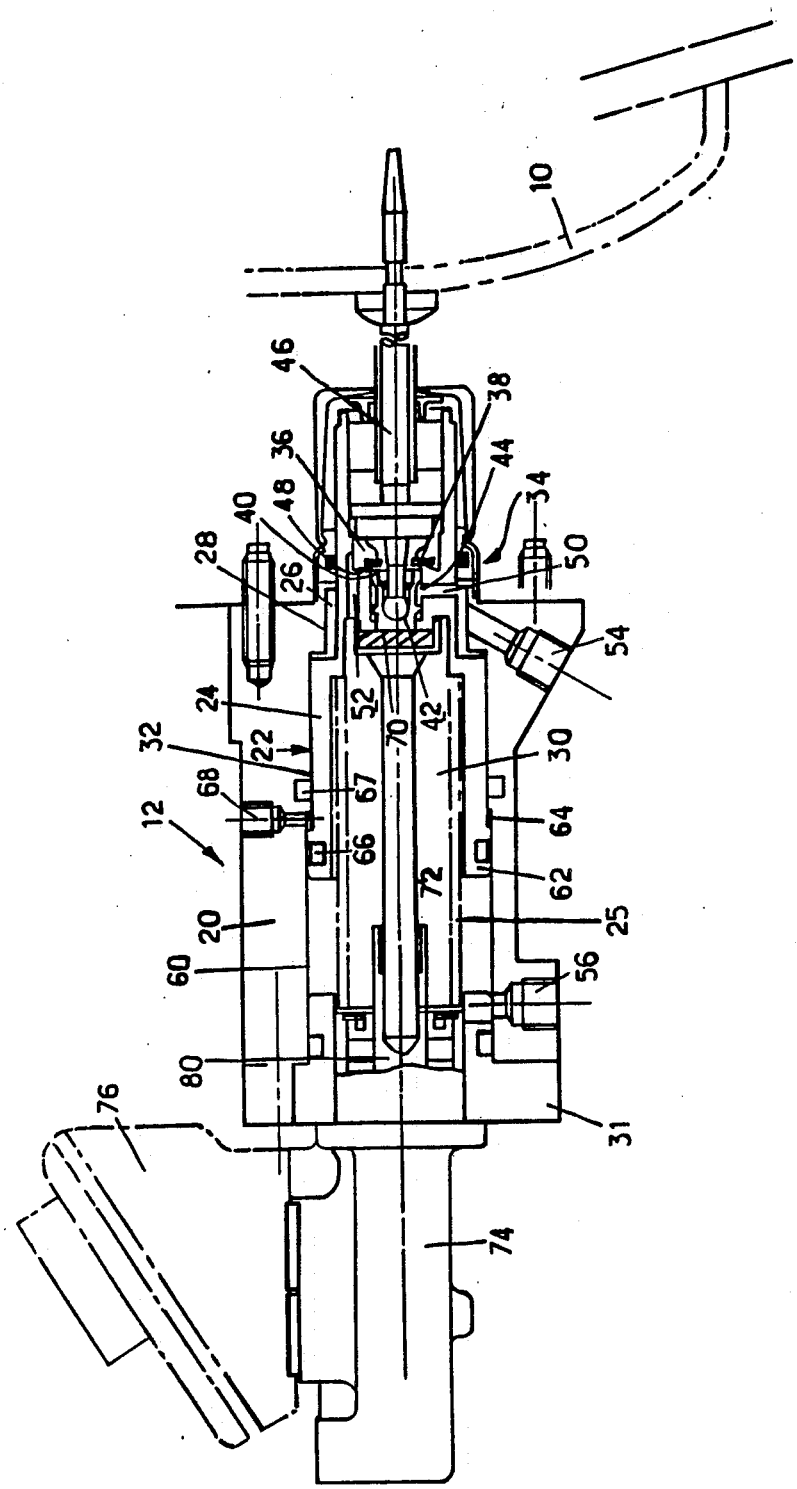
FIG. 2 is a view in longitudinal section illustrating the control valve of the braking system of FIG. 1.

As illustrated more particularly in FIG. 2, the control valve 12 comprises a body 20, in which is made a stepped bore 22, in which a hollow stepped piston 24 slides sealingly.

The piston 24 divides the bore 22 internally into a first chamber 26, formed at the rear of the stepped bore 22 in its part of smaller diameter 28, and a second chamber 30, formed at the front of the stepped bore 22 in a part of larger diameter 60–32. The first chamber is put selectively in communication with a second chamber or with the atmosphere by means of a conventional annular shutter element, designated as a whole by the reference 34, which is arranged in an inner receptacle 36 of the piston 24 and which has a front annular active part 38 capable of interacting selectively with a first shutter seat 40, formed at the rear end of a valve plunger 42 mounted slidably in a central bore 44 of the piston 24 and coupled to the end of an actuating input rod 46 of the control valve 12, and with a second shutter seat 48 formed in the piston 24 concentrically round the plunger 42.

Thus, by interacting with the shutter seats 40 and 48, the front annular active part 38 of the shutter element 34 makes it possible to control communication between a radial passage 50, formed in the piston 24, communicating with the first chamber 26 at the rear of the control valve 12 and opening into the bore 44, and either the atmosphere prevailing at the rear of the shutter 34, round the input rod 46, or the second chamber 30 at the front of the control valve 12 via at least one passage 52 formed axially in the piston 24 and opening into a connecting zone between the inner end of the receptable 36 and the outer periphery of the shutter seat 48.

The control valve 12 therefore functions in a similar way to a distribution valve of a vacuum-type booster, which conventionally would be an integral part of the booster which it controls and would be located in the hub of the movable partition of the booster in order to obtain a compact arrangement.

The vacuum-type booster is arranged at a distance from this control valve at any location in the engine compartment having sufficient volume for receiving it.

For this purpose, a port 54 is formed in the body 20 of the control valve 12 in order to open into the first chamber 26, and another port 56 is formed in the body 20 in order to open into the second chamber 30.

Referring again to FIG. 1, it will be seen that the assisted hydraulic braking system also includes a vacuum-type booster 14 which consists conventionally of a shell-shaped outer casing 100 delimited internally into a front vacuum chamber 102 and a rear working chamber 104 by means of a movable deformable partition (not shown) connected to the outer peripheral edge of the casing 100 by means of a sealing diaphragm (not shown).

The front chamber 102 is normally connected to a vacuum source (not shown) by means of a connector and a pipeline 106, and the movable deformable partition is returned to its rear rest position by a return spring bearing on the front part of the casing 100. The movable deformable partition bears, by means of its front face and in its central part, on the rear end of a push rod serving for transmitting the boosting force generated in the booster 14 to the pressure transmitter 16, the pressure transmitter being fastened to the front face of the booster in a known way.

The rear working chamber 104 of the booster 14 is connected to the first chamber 26 of the control valve 12 via a first pipeline 110 and the port 54, and the front vacuum chamber 102 of the booster is connected to the second chamber 30 of the control valve 12 via a second pipeline 112 and the port 56.

The stepped bore 22 comprises three steps 28, 32 and 60 in order of diameter increasing from the rear forwards. Correlatively, the stepped piston 24 comprises a step 62 of a diameter equal to that of the step 60 of the bore 22.

The stepped piston 24 therefore also comprises three steps of diameters equal to those of the stepped bore 22 and sliding sealingly in each of them. Furthermore, the step 62 of the piston 24 divides the part 32 of the bore 22 internally, to form a annular volume 64 at the rear of the step 62 of the piston 24 and at the front of the step 32 of the bore 22. The volume 64 is sealed by means of gaskets 66 on the step 62, and 67 in the bore 32. The volume 64 thus has a capacity variable as a function of the position of the piston 24 in the bore 22. A port 68 is formed in the body 20 of the control valve so as to open permanently into the volume 64. This port 68 is connected to the pipeline 114 delivering the brake fluid under pressure coming from the pressure transmitter 16 which consists of a single master cylinder.

The bore 22 is closed off sealingly by means of a piece 31 serving as an intermediate piece or collar for mounting a master cylinder 74 on the body 20.

Moreover, the piston 24, in its central part, carries a reaction disc 70 made of elastomeric material, on which bears the rear end of a push rod 72 serving for transmitting the braking force generated by the system-to the master cylinder 74. This last is fastened sealingly to the front part of the body 20 of the control valve and comprises a piston 80 which extends in the stepped bore 22 and on which the push rod 72 comes to bear. The master cylinder is connected to a fluid reservoir 76 and forces this hydraulic liquid under pressure into a pipeline 78 towards at least one wheel brake (not shown).

The hydraulic braking system Just described functions as follows. At rest, all the movable components occupy their rear position, to the right in the Figures. In this position, the shutter 34 of the control valve allows communication between the first chamber 26 and the second chamber 30 and therefore, by means of the pipelines 110 and 112, between the working chamber 104 and the vaccum chamber 102 of the booster 14. Since the chamber 102 is connected constantly to a vacuum source by means of the pipeline 106, the chamber 104 is itself therefore subjected to the same pressure as the chamber 102 and is consequently also under a vacuum, and the movable deformable partition is balanced in its rear position.

When the vehicle driver actuates the brake pedal 10, the actuating rod 46 moves forwards. Under the effect of this movement, the seat 40 formed on the sensor 42 comes away from the shutter 38, and the latter comes to bear sealingly on the seat 48 formed on the piston 24. Consequently, communication between the first chamber 26 and the second chamber 30 is broken, and the first chamber 26 is put in communication with the outside atmosphere. By means of the port 54 and the first pipeline 110, the working chamber 104 of the booster is itself subjected to the atmospheric pressure, whereas the vacuum chamber 102 is still under a vacuum. This pressure difference between the chambers 102 and 104 is applied to the two faces of the movable deformable partition and tends to move it forwards, thus generating a boosting force.

This boosting force is transmitted to the push rod of the pressure transmitter 16 which consists of a single master cylinder connected to a brake-fluid reservoir 18 and forcing this hydraulic fluid under pressure into a pipeline 114.

The pressure increase in the pipeline 114 at the outlet of the transmitter 16 is transmitted to the annular volume 64 of the control valve via the port 68 and therefore causes this volume to be extended, thus resulting in the advance of the piston 24. The latter in turn advances the push rod 72 and the piston 80 of the master cylinder 74 which will itself cause the pressure of the hydraulic fluid in the pipeline 78 towards the wheel brakes to increase.

In the event of any failure occurring in the control valve or the booster, braking can still be carried out as a result of the direct mechanical action of the brake pedal 10, the actuating rod 46, the piston 24, the reaction disk 70, the push rod 72 and the piston 80 of the master cylinder 74. Of course, braking in the event of a failure will be obtained without assistance, that is to say, with a lengthened pedal stroke and a higher force exerted on the pedal.

We therefore indeed have an assisted hydraulic braking system, in which the booster is controlled pneumatically and affords assistance given in hydraulic form to a master cylinder, in which braking is ensured even in the event of failure of one of the elements affording assistance, and in which the vacuum-type booster can be arranged at any location in the engine compartment and no longer necessarily behind the brake pedal.

Figure 3:
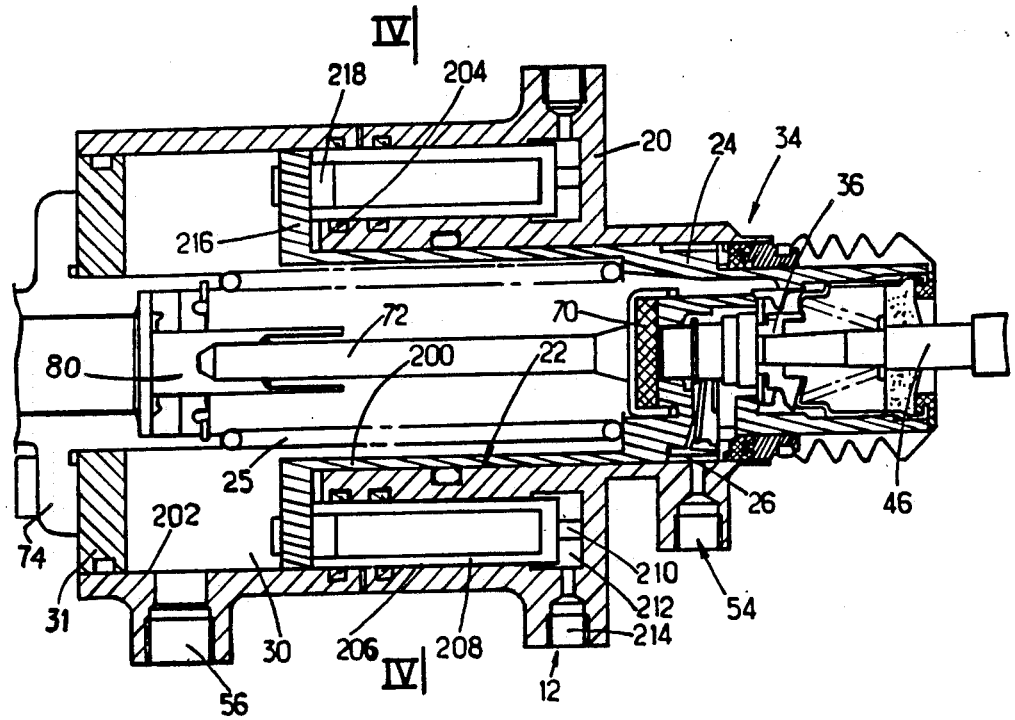
FIG. 3 is a view in longitudinal section of another embodiment of the control valve.

FIG. 3 illustrates another embodiment of the control valve, where the elements identical with those of FIG. 2 have been given the same reference numerals.

The control valve 12 comprises a body 20, in which a stepped bore 22 wherein a piston 24 slides sealingly has been made. As before, the piston 24 divides the bore 22 internally into a first chamber 26 formed at the rear of the stepped bore 22 and a second chamber 30 formed at the front of the stepped bore 22. The first chamber is put selectively in communication with the second chamber or with the atmosphere by means of a conventional annular shutter element, designated as a whole by the reference 34, which is arranged in an inner receptable 36 of the piston 24. The first chamber 26 is connected to the rear chamber 104 of the booster 12 by means of a pipeline, and the second chamber 30 is connected to the front chamber 102 of the booster. The latter actuates a pressure transmitter 16 which transmits to a hydraulic fluid a boosting pressure obtained from the actuating means of the master cylinder 74 which forces a brake fluid under boosted pressure towards the wheel brakes.

The stepped bore 22 comprises two steps 200 and 202, the step 202 being located towards the front of the bore 200 and having a diameter considerably larger than that of the bore 200. These two bores 200 and 202 between them define an annular surface 204 of an outside diameter equal to that of the bore 202 and of an inside diameter equal to that of the bore 200.

Axial blind bores 206 arranged at a uniform distance from one another are made in the body 20 from the front of the valve body 20 and perpendicularly relative to the surface 204. Each bore receives sliding sealingly a piston 208 which, at its rear end, carries a stud 210 so as to provide a volume 212 at the bottom of the bore 206. A port 214 is made in the body 20 so as to open permanently into the volume 212.

The front end of the piston 24 has a portion 216 of annular form which extends radially outwards and the outside diameter of which is slightly less than the diameter of the bore 202. In the example illustrated, elements 218 are fastened to the portion 216 and interact with the pistons 208, so as to ensure the relative positioning of the pistons 208 in relation to the portion 216 permanently and accurately.

Figure 4:
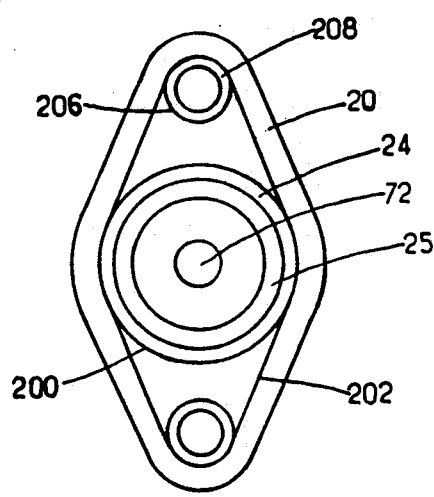
FIG. 4 is a section through the valve of FIG. 3 in a plane extending along the line IV—IV of FIG. 3.

If only two bores 206 are made in the body 20, there will be no need to give the bore 202 a circular form. In the illustrated example of two bores 206, FIG. 4 shows that the bore 202 has an oblong form, the portion 216 of the piston 24 likewise having a matching oblong form.

The functioning of the control valve illustrated in FIG. 3 is identical with that of the valve described above. During an actuation of the brake pedal, the valve 12 commands the activation of the booster 14 which in turn actuates the pressure transmitter 16. The pressure increase in the pipeline 114 at the outlet of the transmitter 16 is transmitted to the volumes 212 at the rear of the bores 206 via the ports 214 and thus causes the forward movement of the pistons 208. The piston 24 is therefore subjected to an actuating force transmitted by the rod 46 and to a boosting force transmitted by the pistons 208 and consequently transmits the sums of these forces to the actuating rod 72 of the master cylinder 74 which itself will generate a boosted pressure in the brake fluid in the pipeline 78 leading towards the wheel brakes.

According to the invention, therefore, there is provided an assisted hydraulic braking system, in which the brake pedal acts directly on an actuating rod of the control valve, while the brake booster can be placed at any location under the bonnet of the vehicle. Such an assisted hydraulic braking system is designed particularly to be used on vehicles with right-hand drive, in which it is generally not possible to place the booster between the brake pedal and the master cylinder in the usual way. It can be used in other circumstances, however, as soon as the customary installation of the booster presents problems of space. The desired brake boosting is obtained by means of a force on the brake pedal which is lower than that required by a conventional hydraulic system and with a reduced number of hydraulic connections under pressure.

Of course, the invention is not limited to the embodiment just described by way of example, but embraces all its alternative versions.

Thus, the pipeline 106 connected at one end to the vacuum source has been shown connected at the other end to the front vacuum chamber 102 of the booster, but could just as well be connected to the pipeline 112 or to the second chamber 30 by means of a port which would be made in the body of the control valve and which would open permanently into this chamber.

Likewise, the brake boosting afforded by the booster 14 and the pressure transmitter 16 has been shown as being supplied to the control valve 12 in order to assist the movement of the piston 24. It is, of course, possible to supply this boosting pressure to the master cylinder 74 which would then have an additional annular actuating chamber in the way described for the master cylinder which is the subject of the above-mentioned document. To obtain a balanced system, it will therefore be preferable likewise to subject the reaction disc 70 to the force generated by the boosting pressure.

If the movement of the piston 24 is assisted by means of auxiliary pistons 208, there can be any number of these pistons, depending on the boost required or the diameter of the valve.

On the other hand, it is not necessary to use two reservoirs 18 and 76, and only one of these need be provided on one of the master cylinder, the other one being fed by means of pipelines.

Finally, although the booster system has been described as functioning between atmospheric pressure and a vacuum, it is clear that all other pressures can be used, provided that their difference makes it possible to supply the required boost.

WHAT WE CLAIM IS :

1. An assisted hydraulic braking system comprising :
   a brake pedal connected to an actuating rod,
   a pneumatic brake booster comprising a front vacuum chamber and a rear working chamber separated by a movable deformable partition acting on a push rod,
   a single master cylinder piston of which is acted on by said push rod,
   means for controlling the booster, comprising shutter means putting a first chamber selectively in communication with one of a second chamber and atmosphere responsive to an actuation of the brake pedal,
   a first pipeline putting the first chamber of the control means in communication with the working chamber of the booster,
   a second pipeline putting the second chamber of the control means in communication with the vacuum chamber of the booster,
   a second master cylinder having outlets of which are connected to at least one wheel brake, said the second master cylinder being subjected to the actuating pressure transmitted by the actuating rod and increased by the boosting pressure generated by the single master cylinder.

2. The system according to claim 1, wherein said means for controlling the booster comprises a body in which is provided at least one sealed volume connected by a pipeline to the working chamber of said single master cylinder.

3. The system according to claim 2, wherein said control means further comprises a second piston sliding sealingly in a bore formed in the body and dividing the bore internally into the first chamber formed at the rear of the bore and the second chamber formed at the front of the bore, the shutter element having a front annular active part interacting selectively with two concentric shutter seats formed respectively in the piston and by a valve plunger sliding in the second piston and coupled to the actuating rod.

4. The system according to claim 3, wherein the second piston carries a reaction disc, on which bears a rear end of a push rod actuating said second master cylinder.

5. The system according to claim 4, wherein the second piston and the bore are stepped.

* * * * *